US012730710B2

(12) United States Patent
Cheng et al.

(10) Patent No.: US 12,730,710 B2
(45) Date of Patent: Sep. 8, 2026

(54) MEMORY DEVICE AND DATA ERASING METHOD THEREOF

(71) Applicant: Winbond Electronics Corp., Taichung City (TW)

(72) Inventors: Ju-Chieh Cheng, Taichung City (TW); Lung-Chi Cheng, Hsinchu County (TW); Shan-Hsuan Tsai, Taichung City (TW); Yu-Cheng Chuang, Hsinchu County (TW)

(73) Assignee: Winbond Electronics Corp., Taichung City (TW)

( * ) Notice: Subject to any disclaimer, the term of this patent is extended or adjusted under 35 U.S.C. 154(b) by 2 days.

(21) Appl. No.: 19/173,837

(22) Filed: Apr. 9, 2025

(65) Prior Publication Data

US 2026/0016966 A1 Jan. 15, 2026

(30) Foreign Application Priority Data

Jul. 15, 2024 (TW) ................................ 113126445

(51) Int. Cl.

| | |
|---|---|
| ***G06F 11/00*** | (2006.01) |
| ***G06F 11/07*** | (2006.01) |
| ***G06F 11/10*** | (2006.01) |
| ***G06F 11/14*** | (2006.01) |
| ***G06F 11/22*** | (2006.01) |

(52) U.S. Cl.
CPC ........ *G06F 11/1016* (2013.01); *G06F 11/073* (2013.01); *G06F 11/141* (2013.01); *G06F 11/22* (2013.01)

(58) Field of Classification Search
CPC .. G06F 11/073; G06F 11/1016; G06F 11/141; G06F 11/22
See application file for complete search history.

(56) References Cited

U.S. PATENT DOCUMENTS 5,774,396 A * 6/1998 Lee ..................... G11C 11/5635 365/185.11
6,058,060 A * 5/2000 Wong .................. G11C 27/005 365/185.24

(Continued)

FOREIGN PATENT DOCUMENTS

CN 1945743 4/2007
CN 112614526 4/2021

(Continued)

*Primary Examiner* — Joshua P Lottich
(74) *Attorney, Agent, or Firm* — JCIPRNET

(57) ABSTRACT

A memory device and a data erasing method are provided. The data erasing method includes: performing a first data erasing operation on a memory block, wherein the memory block includes a first word line to an Nth word line, and N is a positive integer greater than 1; performing an erase verification operation on the first word line to the Nth word line of the memory block one by one sequentially; finding a failed word line of a memory cell where a first verification failure occurs in the erase verification operation; and making the failed word line to the Nth word line at least one selected word line, making remaining word lines at least one non-selected word line, masking the at least one non-selected word line, and performing a second data erasing operation on a memory cell of the at least one selected word line.

20 Claims, 5 Drawing Sheets

(56) References Cited

U.S. PATENT DOCUMENTS

| | | | | |
|---|---|---|---|---|
| 6,381,670 | B1 * | 4/2002 | Lee | G11C 11/5628 365/104 |
| 8,565,019 | B2 * | 10/2013 | Honda | G11C 11/5628 365/185.24 |
| RE46,264 | E | 1/2017 | Hemink et al. | |
| 12,009,037 | B2 * | 6/2024 | Lim | G11C 11/5628 |
| 2002/0114192 | A1 * | 8/2002 | Takase | G11C 16/10 365/185.28 |
| 2011/0145633 | A1 * | 6/2011 | Dickens | G06F 11/073 714/6.1 |
| 2012/0005403 | A1 * | 1/2012 | Scouller | G06F 11/0763 711/E12.001 |
| 2013/0250692 | A1 * | 9/2013 | Manea | G11C 16/10 365/185.18 |
| 2016/0211035 | A1 * | 7/2016 | Shapira | G06F 11/073 |
| 2019/0139590 | A1 * | 5/2019 | Berger | G06F 11/073 |
| 2019/0196966 | A1 * | 6/2019 | Hwang | G06F 12/10 |
| 2020/0057687 | A1 * | 2/2020 | Louie | G11C 11/1675 |
| 2021/0049086 | A1 * | 2/2021 | Bang | G06F 11/3058 |
| 2022/0383963 | A1 | 12/2022 | Prakash et al. | |
| 2023/0138586 | A1 * | 5/2023 | Hong | G06F 3/0673 711/162 |
| 2024/0028214 | A1 * | 1/2024 | Eliash | G01R 19/165 |
| 2024/0112742 | A1 | 4/2024 | Huang | |
| 2024/0126647 | A1 * | 4/2024 | Lee | G06F 11/1076 |
| 2025/0383960 | A1 * | 12/2025 | Li | G06F 11/1048 |

FOREIGN PATENT DOCUMENTS

| | | |
|---|---|---|
| CN | 113409870 | 9/2021 |
| TW | 201118878 | 6/2011 |
| TW | 202029204 | 8/2020 |
| TW | I796148 | 3/2023 |

* cited by examiner

MEMORY DEVICE AND DATA ERASING METHOD THEREOF

CROSS-REFERENCE TO RELATED APPLICATION

This application claims the priority benefit of Taiwan application serial no. 113126445, filed on Jul. 15, 2024. The entirety of the above-mentioned patent application is hereby incorporated by reference herein and made a part of this specification.

BACKGROUND OF THE INVENTION

Field of the Invention

The invention relates to a memory device and a data erasing method thereof, and in particular, to a memory device and a data erasing method thereof that may extend service life.

Description of Related Art

Conventional NOR flash memory generally performs data erasing operations in block type. Still limited by factors such as process uniformity or defects, the phenomenon of so-called tailing or outliers of fast or slow erasing of memory cells occurs. However, currently, when a data erasing operation is performed, the entire memory block is erased, and the erasing operation may not be performed separately for fast or slow erase memory cells. In the operating mode of this architecture, after a long period of writing and erasing, the rapid deterioration of the memory cells is accelerated and the reliability of the memory is reduced.

SUMMARY OF THE INVENTION

The invention provides a memory device and a data erasing method thereof that may reduce the number of erasing operations needed by the memory device and increase service life.

A data erasing method of the invention includes: performing a first data erasing operation on a memory block, wherein the memory block includes a first word line to an Nth word line, and N is a positive integer greater than 1; performing an erase verification operation on the first word line to the Nth word line of the memory block one by one sequentially; finding a failed word line of a memory cell where a first verification failure occurs in the erase verification operation; and making the failed word line to the Nth word line at least one selected word line, making remaining word lines at least one non-selected word line, masking the at least one non-selected word line, and performing a second data erasing operation on a memory cell of the at least one selected word line.

A memory device of the invention includes a memory block and a controller. The memory block includes a first word line to an Nth word line, and N is a positive integer greater than 1. The controller is coupled to the memory block. The controller is configured to perform the above data erasing method.

Based on the above, the controller of the memory device of the invention finds the failed word line that did not pass the erase verification operation in the erasing operation, and performs the next erasing operation by masking the word line before the failed word line and selecting the failed word line and the subsequent word line thereof. In this way, the word line that passes the verification is not affected by the bias of the erase voltage multiple times, thus effectively alleviating the degradation rate of the memory cells and increasing the overall life of the memory device.

DESCRIPTION OF THE EMBODIMENTS

Figure 1:
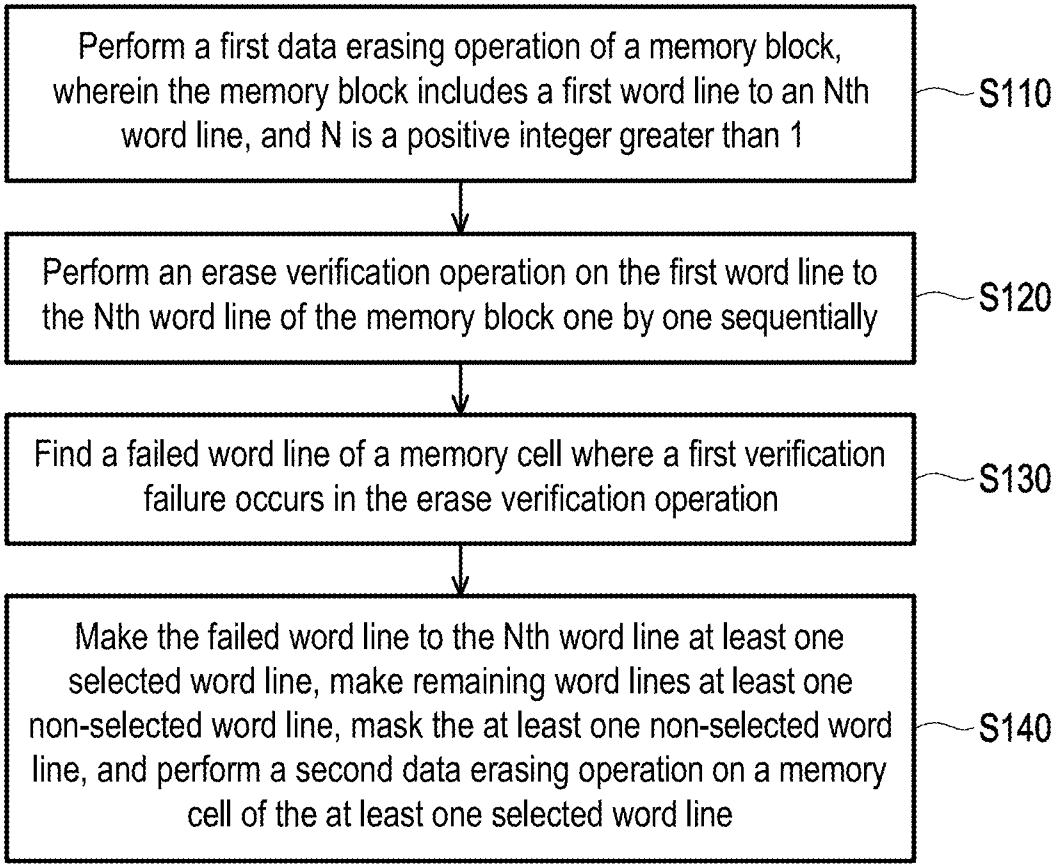
FIG. 1 shows a flowchart of a data erasing method of an embodiment of the invention.

Please refer to FIG. 1. FIG. 1 shows a flowchart of a data erasing method of an embodiment of the invention. In particular, in step S110, a memory device may perform a first data erasing operation of a memory block thereof via a controller, wherein the memory block includes a first word line to an Nth word line, and N is a positive integer greater than 1. In particular, the first data erasing operation is a block-type data erasing operation. That is, in step S110, the controller may perform a one-time data erasing operation on the complete block of the memory block.

Next, in step S120, the controller may perform an erase verification operation on the first word line to the Nth word line of the memory block one by one sequentially. In particular, the controller may sequentially perform a read operation on each memory cell on each word line of the memory block, and check whether each memory cell on each word line is in the erased state via the read operation to obtain the erase verification result corresponding to each memory cell.

The erase verification operation may continue to be performed when the erase verification result of the memory cell does not fail. In contrast, when there is a memory cell where a first verification failure occurs in the erase verification operation, the controller may find a failed word line of the memory cell where the first verification failure occurs in the erase verification operation (step S130).

In step S140, the controller may make the failed word line to the Nth word line the at least one selected word line, and make the remaining word lines (the first word line to the previous word line of the failed word line) the at least one non-selected word line. Furthermore, the controller may mask the memory cell on the at least one non-selected word line, and perform a second data erasing operation on the memory cell on the at least one selected word line.

In detail, the controller may provide a mask voltage to the non-selected word line and provide an erase voltage to the selected word line. Thereby, the controller may perform a block-type data erasing operation (second data erasing operation) on the memory cell on the selected word line. While the second data erasing operation is being performed, the non-selected word line receives the mask voltage, and therefore the memory cell on the non-selected word line may be masked without being affected by the bias of the erase voltage to maintain the original state.

In the present embodiment, the absolute value of the voltage difference between the mask voltage and the substrate voltage of the memory block is less than the absolute value of the voltage difference between the erase voltage and the substrate voltage of the memory block. Based on the voltage difference generated between the substrate voltage of the memory block and the erase voltage, the charge stored in the memory cell may be effectively removed to achieve the data erasing operation. In contrast, the difference between the substrate voltage and the mask voltage of the memory block is not enough to remove the charge stored in the memory cell, and therefore the corresponding memory cell may be effectively masked in the second data erasing operation.

In an embodiment of the invention, in the data erasing operation of the memory block, by erasing the memory cell on the verified word line, when the second data erasing operation is performed, there may be a mask to avoid receiving the influence of the bias voltage between the erase voltage and the substrate voltage, and the degradation rate of the memory cell may be effectively alleviated to increase the overall life of the memory device.

Figure 2:
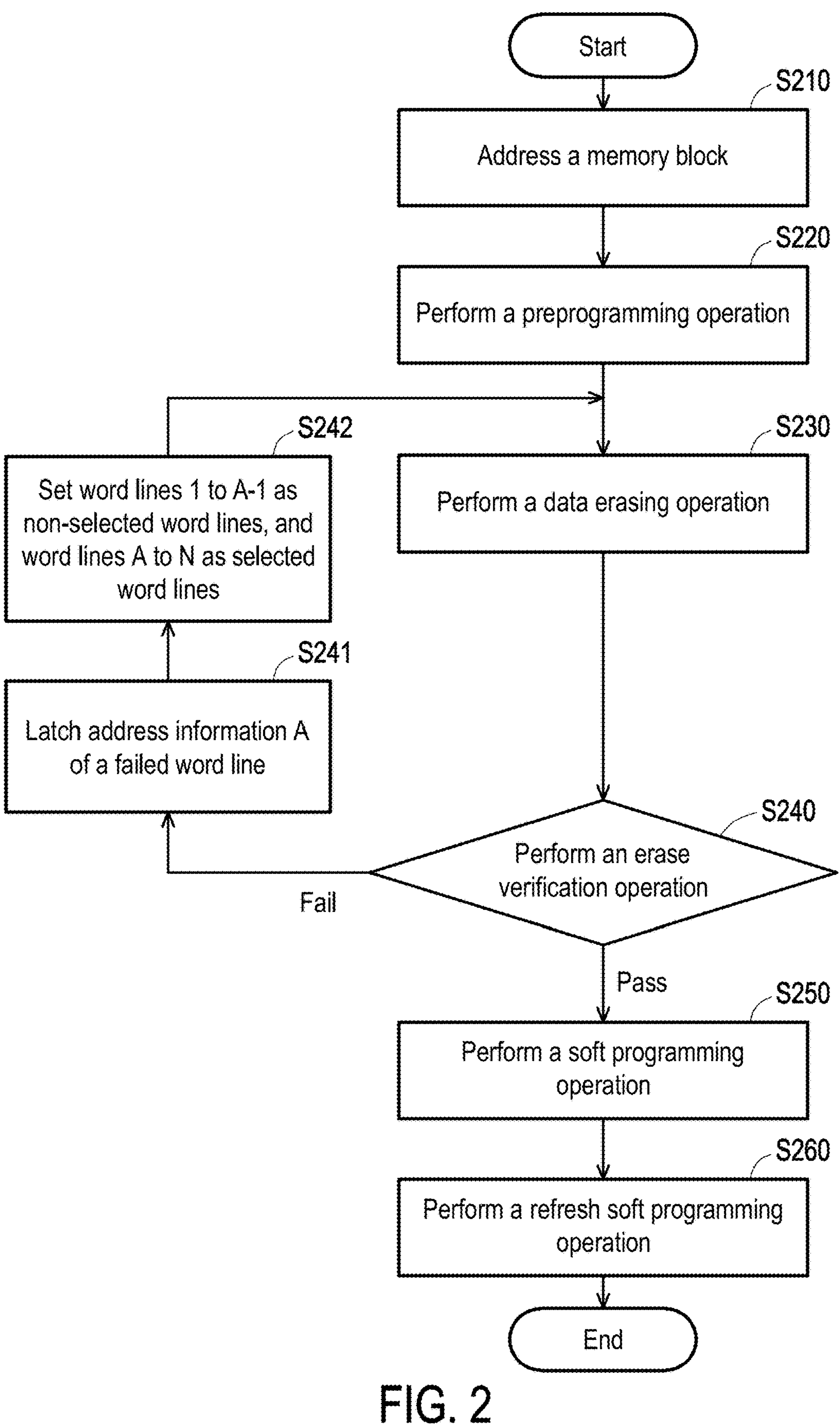
FIG. 2 shows a flowchart of a data erasing method of another embodiment of the invention.

Please refer to FIG. 2. FIG. 2 shows a flowchart of a data erasing method of another embodiment of the invention. In step S210, a memory device may perform an addressing operation of a memory block via a controller. In step S220, the controller may first perform a preprogramming operation on the memory block. In step S230, the controller performs a data erasing operation of the memory block. Here, the data erasing operation of the memory block may be a block-type data erasing operation. That is, the controller may perform the data erasing operation on all memory cells in the memory block together. In detail, the controller may apply an erase voltage to all word lines of the memory block, and remove the charge stored in each memory cell via the bias generated between the erase voltage and the voltage received on the substrate of the memory cell to achieve the object of data erasing.

In the present embodiment, the erase voltage may be applied to each word line via incremental step pulses or other methods well known to those skilled in the art, without certain limitations.

After the data erasing operation of step S230 is completed, in step S240, the controller may perform an erase verification operation on the memory block. If the verification result of the erase verification operation in step S240 is pass, step S250 may be performed. In contrast, if the verification result of the erase verification operation in step S240 is fail, step S241 is performed.

In step S241, when the verification result of the erase verification operation is fail, the controller may interpret and latch address information A of the word line (i.e., the failed word line) of the memory cell where the erase verification failure occurs. Here, the address information A may be digital information. The controller may also store the address information A in a storage element. The storage element may be any element that may store digital information such as any memory, register in a digital circuit, or latch. The storage element may be built into the controller or external to the controller, without certain limitations.

Next, in step S242, the controller sets a word line 1 to a word line A-1 as non-selected word lines, and sets a word line A to a word line N as selected word lines. Then, step S230 is entered to perform a second data erasing operation on the memory block.

In the second data erasing operation, the word line 1 to the word line A-1 may receive the mask voltage, and the word line A to the word line N may receive the erase voltage. Relevant details are described in the above embodiments and are not repeated here.

In the present embodiment, after the second data erasing operation of step S230 is completed, the erase verification operation of step S240 still needs to be performed. If the erase verification operation still fails at this time, the controller may repeat steps S241, S242, and S230 and perform the next data erasing operation. After the erase verification operation of step S240 is passed, step S250 may be performed.

In step S250, the controller may perform a soft programming operation on the memory block. In particular, the controller may prevent the phenomenon of over-erasing of memory cells in the memory device via the soft programming operation.

Next, in step S260, the controller may perform a refresh programming operation on the memory block.

Figure 3A:
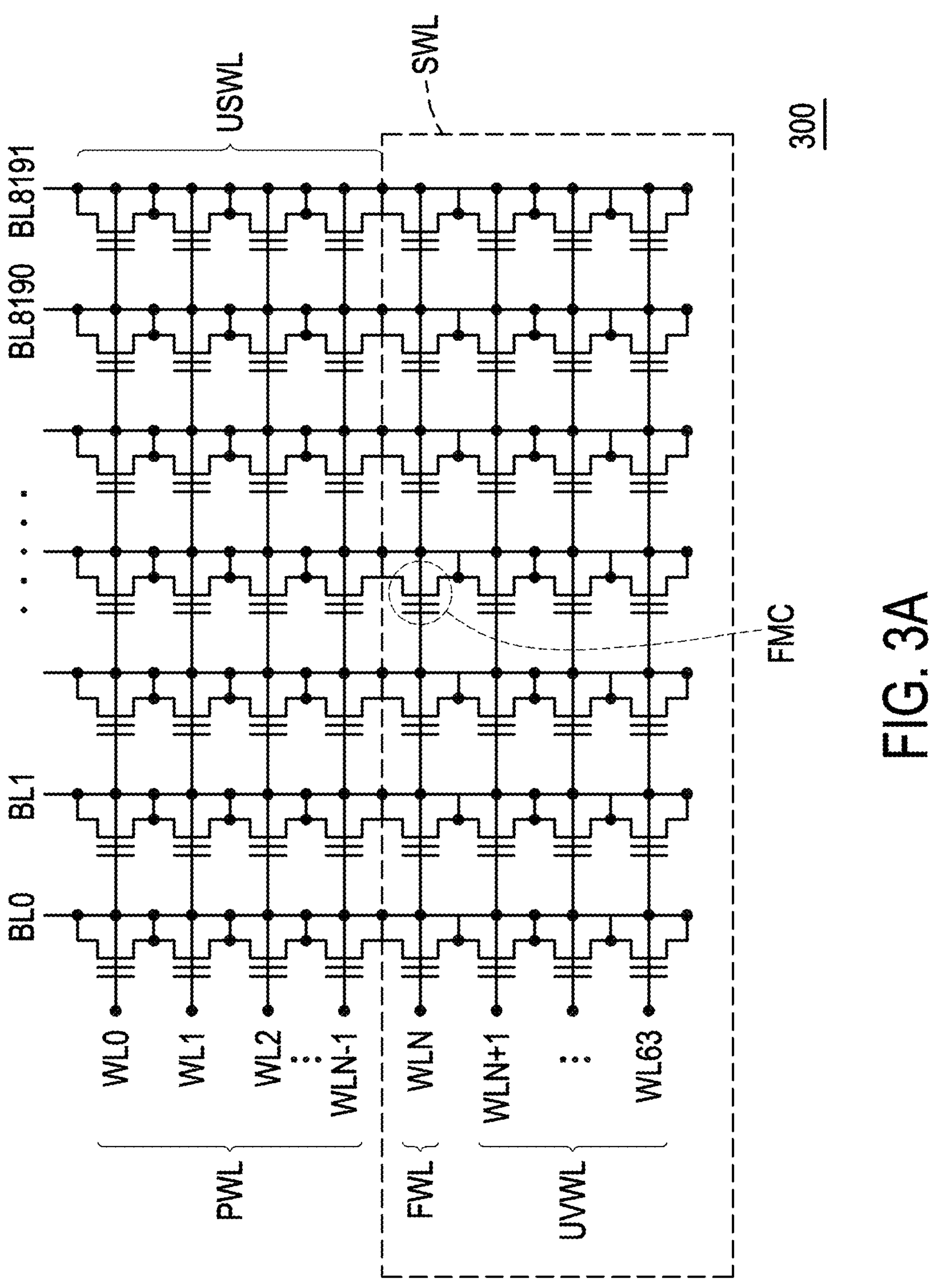
FIG. 3A to FIG. 3C show schematic diagrams of an operation of a data erasing method of a memory device of an embodiment of the invention.
Figure 3B:
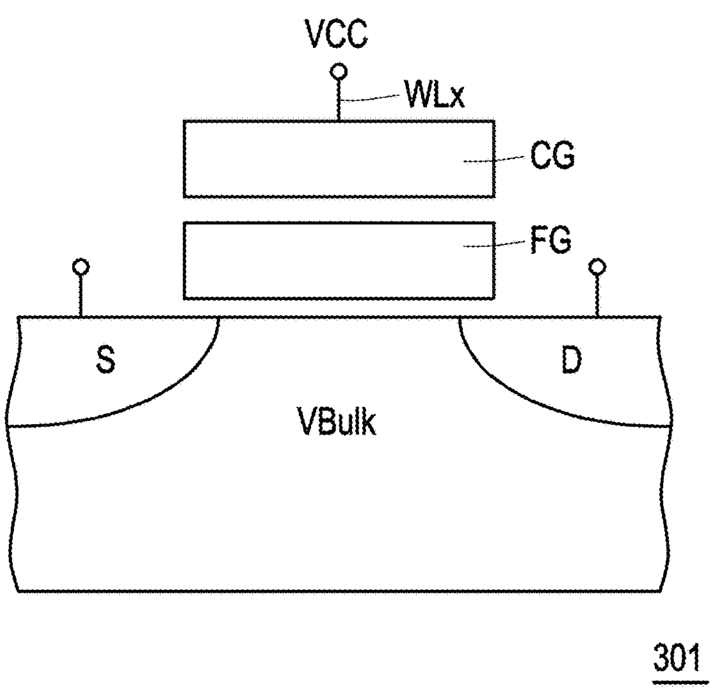
Figure 3C:
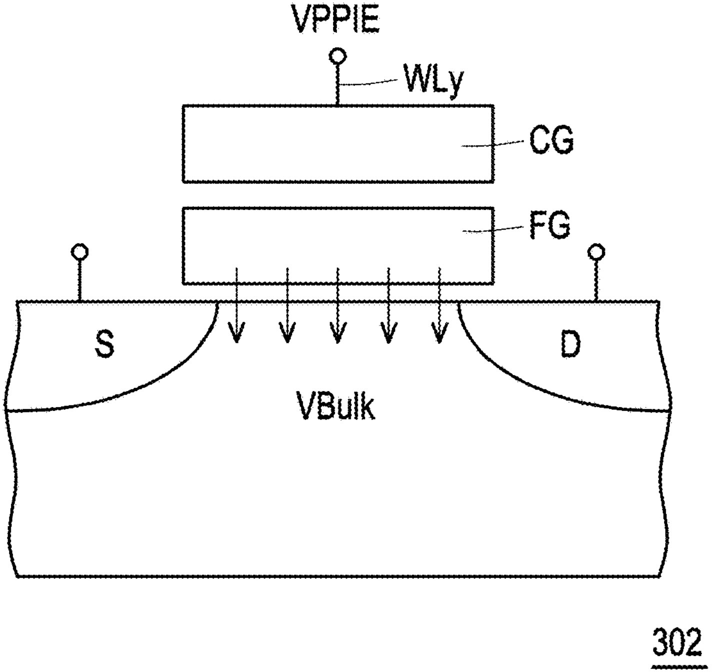

Please refer to FIG. 3A to FIG. 3C below. FIG. 3A to FIG. 3C show schematic diagrams of an operation of a data erasing method of a memory device of an embodiment of the invention. In FIG. 3A, a memory block 300 is a NOR flash memory block. The memory block 300 has a plurality of word lines WL0 to WL63 and a plurality of bit lines BL0 to BL8191. Each of the word lines WL0 to WL63 may have a plurality of flash memory cells.

When the data erasing operation of the memory block 300 is performed, the controller of the memory device may first apply an erase voltage to all word lines WL0 to WL63 to perform a block-type data erasing operation (first data erasing operation) on all memory cells in the memory block 300. Then, the controller may perform an erase verification operation on the memory cells on the word lines WL0 to WL63 one by one sequentially. In the present embodiment, the erase verification operations of the memory cells on the word lines WL0 to WLN-1 are all pass, and in the verification operation of the word line WLN, the erase verification operation of the memory cells FMC is fail. At this time, the controller may stop the erase verification operation, set the word lines WL0 to WLN-1 to pass word lines PWL; set the word line WLN to a failed word line FWL; and set the word lines WLN+1 to WL63 as unverified word lines UVWL.

Further, the controller sets the word lines WL0 to WLN-1 of the passed word line PWL as non-selected word lines USWL, and sets the word line WLN of the failed word line FWL and the word lines WLN+1 to WL63 of the unverified word lines UVWL as selected word lines SWL. Next, the controller may apply a mask voltage to the non-selected word lines USWL (the word lines WL0 to WLN-1), and apply an erase voltage to the selected word lines SWL (the word lines WLN to WL63), thereby performing the second data erasing operation of the memory block 300.

It should be noted that the number of word lines and bit lines of the memory block 300 in the present embodiment is only an example for illustration and is not intended to limit the scope of the invention. The designer may set the number of word lines and bit lines of the memory block 300 according to actual needs, without certain limitations.

In FIG. 3B, a memory cell 301 has a floating gate FG and a control gate CG. When the memory cell 301 corresponds to a non-selected word line WLx, a control gate CG coupled to the word line WLx may receive a mask voltage VCC, the substrate of the memory cell 301 may receive a substrate voltage VBulk, and a source S and a drain D of the memory cell 301 may be in a floating state. In the present embodiment, the mask voltage VCC and the substrate voltage VBulk may both be positive voltages. For example, the mask voltage VCC may be 2 V, and the substrate voltage VBulk may be 10 V.

In FIG. 3C, a memory cell 302 also has the floating gate FG and the control gate CG. When the memory cell 302 corresponds to a selected word line WLy, the control gate CG coupled to the word line WLy may receive an erase voltage VPPIE. The substrate of the memory cell 302 also receives the substrate voltage VBulk, and the source S and the drain D of the memory cell 302 may be in a floating state. In the present embodiment, the erase voltage VPPIE may be a negative voltage, and the substrate voltage VBulk may be a positive voltage. For example, the erase voltage VPPIE may be −10 V, and the substrate voltage VBulk may be 10 V.

According to the description of FIG. 3B and FIG. 3C, it may be known that when the second data erasing operation is performed, for the memory cell corresponding to the non-selected word line WLx, the absolute value (=8 V) of the voltage difference between the substrate voltage VBulk and the mask voltage received by the bit line WLx may be less than the absolute value (=20 V) of the voltage difference between the substrate voltage VBulk of the memory cell corresponding to the selected word line WLy and the erase voltage VPPIE received by the bit line WLy.

Figure 4:
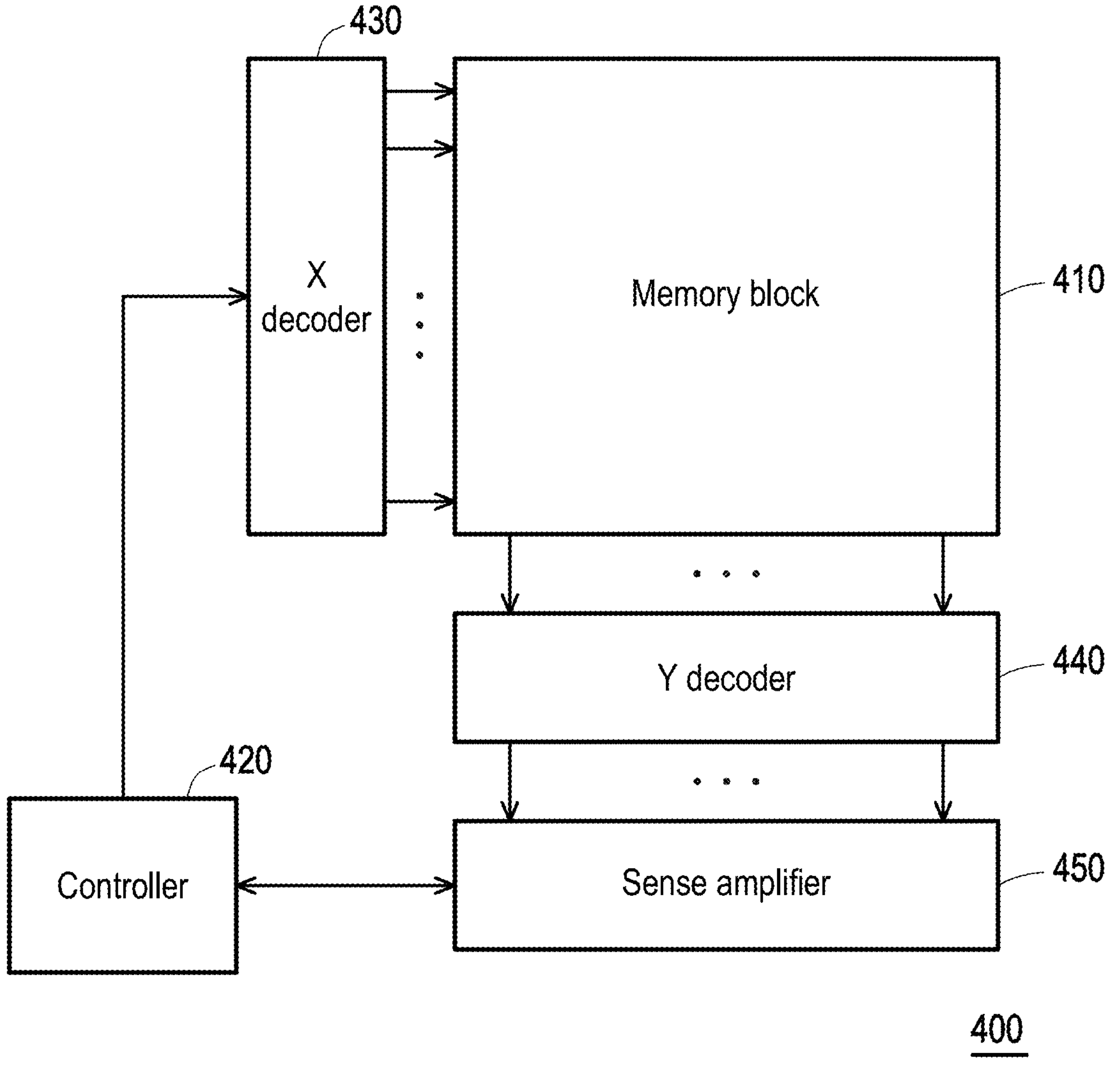
FIG. 4 shows a schematic diagram of a memory device of an embodiment of the invention.

Please refer to FIG. 4 below. FIG. 4 shows a schematic diagram of a memory device of an embodiment of the invention. A memory device 400 includes a memory block 410, a controller 420, an X decoder 430, a Y decoder 440, and a sense amplifier 450. The memory block 410 is coupled to the X decoder 430 and the Y decoder 440. The Y decoder 440 is further coupled to the sense amplifier 450. The controller 420 may be coupled to the X decoder 430, the Y decoder 440, and the sense amplifier 450.

The X decoder 430 is configured to generate the address information of the X direction of the memory block 410, that is, the word line signal of the memory block 410. The Y decoder 440 is configured to generate the address information of the Y direction of the memory block 410, that is, the bit line signal of the memory block 410. The sense amplifier 450 is configured to sense the read signal of the memory block 410. In the present embodiment, in the erase verification operation, the sense amplifier 450 may learn whether each memory cell is in an erased state by sensing the threshold voltage of each memory cell.

The controller 420 is configured to perform the data erasing method of FIG. 1 and FIG. 2. The relevant details are described in detail in the above embodiments and are not described again here.

In the present embodiment, the X decoder 430, the Y decoder 440, and the sense amplifier 450 may be implemented using relevant circuits well known to those skilled in the art. The controller 420 may be a processor having computing capabilities. Or, the controller 420 may be a hardware circuit designed via Hardware Description Language (HDL) or any other digital circuit design method well known to those having ordinary knowledge in the art, and implemented via a field-programmable gate array (FPGA), a complex programmable logic device (CPLD), or an application-specific integrated circuit (ASIC). The memory block 410 may be a NOR flash memory block.

Based on the above, in the data erasing method of the memory device of the invention, when the erase verification operation fails, before the next data erasing operation is performed, the word line that passed the erase verification may be set as the non-selected word line and the word line that did not pass the erase verification may be set as the selected word line. When the next data erasing operation is performed, the non-selected word line may be masked and the data erasing operation may be performed on only the memory cells of the selected word line. In this way, the memory cells that passed the erase verification are not subjected to the erase bias multiple times, thus reducing the rate of memory cell degradation and extending the life of the memory device.

What is claimed is:

1. A data erasing method, comprising:

performing a first data erasing operation of a memory block, wherein the memory block comprises a first word line to an Nth word line, and N is a positive integer greater than 1;

performing an erase verification operation on the first word line to the Nth word line of the memory block one by one sequentially;

finding a failed word line of a memory cell where a first verification failure occurs in the erase verification operation; and making the failed word line to the Nth word line at least one selected word line, making remaining word lines at least one non-selected word line, masking the at least one non-selected word line, and performing a second data erasing operation on a memory cell of the at least one selected word line.

2. The data erasing method of claim 1, wherein the step of masking the at least one non-selected word line and performing the second data erasing operation on the memory cell of the at least one selected word line comprises:

providing a mask voltage to the at least one selected word line to mask the at least one non-selected word line; and providing an erase voltage to the at least one selected word line to perform the second data erasing operation.

3. The data erasing method of claim 2, wherein an absolute value of a voltage difference between the mask voltage and a substrate voltage of the memory block is less than an absolute value of a voltage difference between the erase voltage and the substrate voltage of the memory block.

4. The data erasing method of claim 3, wherein the substrate voltage and the mask voltage of the memory block are positive voltages, and the erase voltage is a negative voltage.

5. The data erasing method of claim 1, further comprising, after the failed word line of the memory cell where the first verification failure occurs in the erase verification operation is found:

storing address information of the failed word line.

6. The data erasing method of claim 5, wherein the step of making the failed word line to the Nth word line the at least one selected word line and making the remaining word lines the at least one non-selected word line comprises:

setting the failed word line to the Nth word line as the at least one selected word line according to the address information; and setting the first word line to a previous word line of the failed word line as the at least one non-selected word line according to the address information.

7. The data erasing method of claim 1, further comprising, before the first data erasing operation:

performing a preprogramming operation on the memory block.

8. The data erasing method of claim 1, further comprising:

performing a second erase verification operation after the second data erasing operation; and performing a soft programming operation and a refresh programming operation sequentially when a verification result of the second erase verification operation is pass.

9. The data erasing method of claim 1, wherein the memory block is a NOR flash memory block.

10. The data erasing method of claim 1, wherein the step of performing the first data erasing operation of the memory block comprises:

performing the first data erasing operation on the memory block in a block type.

11. A memory device, comprising:

a memory block comprising a first word line to an Nth word line, and N is a positive integer greater than 1; and a controller coupled to the memory block, and the controller is configured to:

perform a first data erasing operation of the memory block;

perform an erase verification operation on the first word line to the Nth word line of the memory block one by one sequentially;

find a failed word line of a memory cell where a first verification failure occurs in the erase verification operation; and make the failed word line to the Nth word line at least one selected word line, make remaining word lines at least one non-selected word line, mask the at least one non-selected word line, and perform a second data erasing operation on a memory cell of the at least one selected word line.

12. The memory device of claim 11, wherein the controller is further configured to:

provide a mask voltage to the at least one selected word line to mask the at least one non-selected word line; and provide an erase voltage to the at least one selected word line to perform the second data erasing operation.

13. The memory device of claim 12, wherein an absolute value of a voltage difference between the mask voltage and a substrate voltage of the memory block is less than an absolute value of a voltage difference between the erase voltage and the substrate voltage of the memory block.

14. The memory device of claim 13, wherein the substrate voltage and the mask voltage of the memory block are positive voltages, and the erase voltage is a negative voltage.

15. The memory device of claim 11, wherein the controller is further configured to store address information of the failed word line.

16. The memory device of claim 15, wherein the controller is further configured to:

set the failed word line to the Nth word line as the at least one selected word line according to the address information; and set the first word line to a previous word line of the failed word line as the at least one non-selected word line according to the address information.

17. The memory device of claim 11, wherein the controller is further configured to perform a preprogramming operation on the memory block before the first data erasing operation.

18. The memory device of claim 11, wherein the controller performs a second erase verification operation after the second data erasing operation, and performs a soft programming operation and a refresh programming operation sequentially when a verification result of the second erase verification operation is pass.

19. The memory device of claim 11, wherein the memory block is a NOR flash memory block.

20. The memory device of claim 11, wherein the controller performs the first data erasing operation on the memory block in a block type.

* * * * *